2,773,088

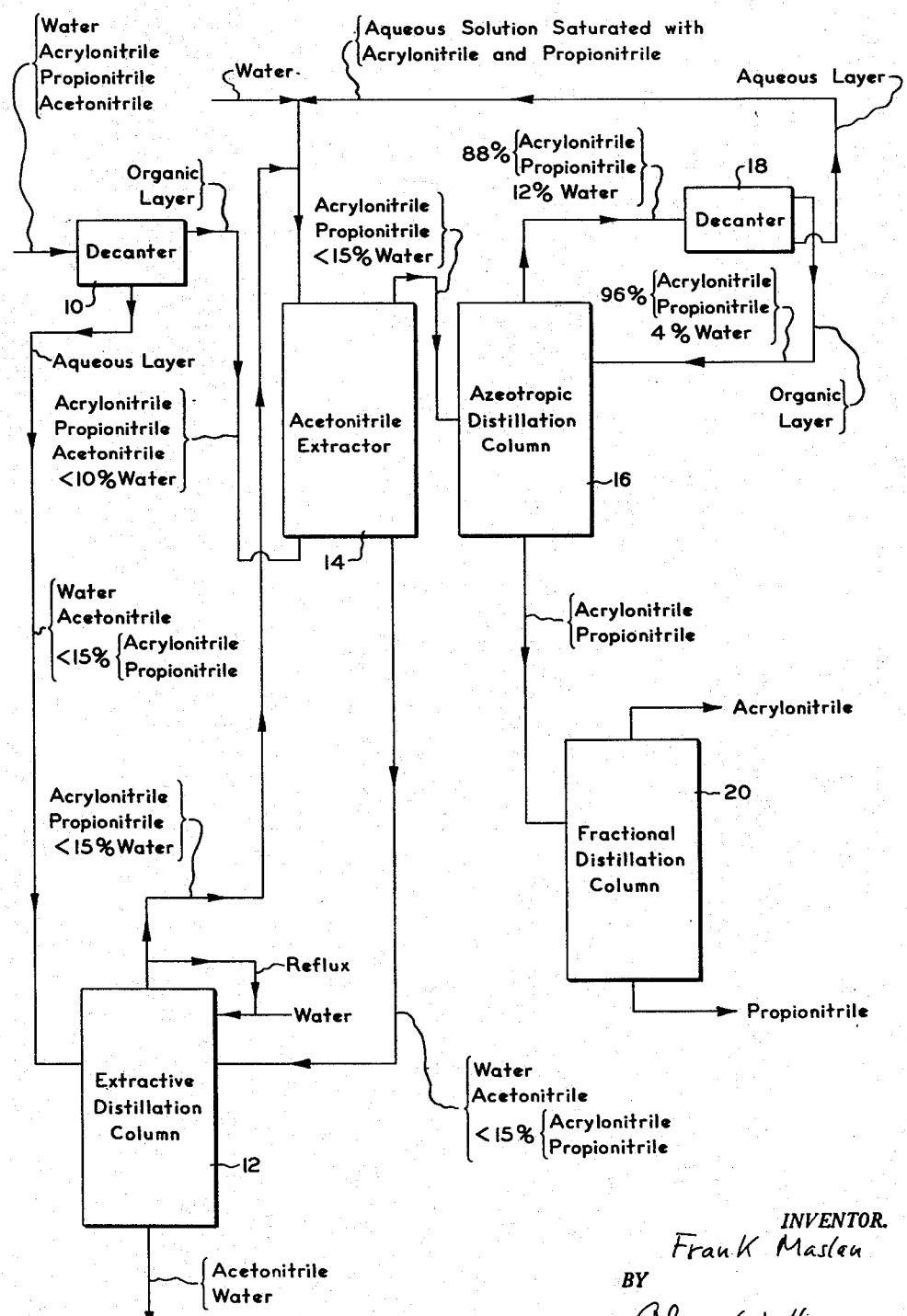

METHOD FOR THE MUTUAL SEPARATION OF ACRYLONITRILE, ACETONITRILE, AND PROPIONITRILE FROM AQUEOUS SOLUTIONS

Frank Maslan, Brookline, Mass., assignor to National Research Corporation, Cambridge, Mass., a corporation of Massachusetts Application May 18, 1955, Serial No. 509,140

5 Claims. (Cl. 260—465.1)

The present invention is directed to the production of chemicals and in particular to the separation and purification of acrylonitrile.

A principal object of the present invention is to provide a method for separating acrylonitrile from aqueous solutions containing acrylonitrile, acetonitrile and propionitrile.

Another object of the present invention is to provide a method for the mutual separation of acrylonitrile, acetonitrile and propionitrile from aqueous solutions.

Other objects of the present invention will in part be obvious and will in part appear hereinafter.

The invention accordingly comprises the method involving the several steps and the relation and the order of one or more of such steps with respect to each of the others which are exemplified in the following detailed disclosure, and the scope of the application of which will be indicated in the claims.

For a fuller understanding of the nature and objects of the invention, reference should be had to the following detailed description taken in connection with the accompanying drawings which is a diagrammatic flow sheet illustrating one preferred embodiment of the invention.

Certain methods for the production of acrylonitrile result in the production of mixtures containing acrylonitrile, acetonitrile and propionitrile. For example, in the production of acrylonitrile by the vapor phase reaction between hydrogen cyanide and acetylene or by the dehydrogenation of propionitrile, mixtures containing predominantly acrylonitrile, with appreciable quantities of acetonitrile and propionitrile, are obtained. In order to obtain the acrylonitrile in a state of high purity and in order to provide an economical separation and purification process therefore, it becomes necessary to separate the above-mentioned nitriles from each other.

Heretofore, processes such as those set forth in U. S. 2,415,662 and Canadian 478,772 have been proposed for separating acrylonitrile from acetonitrile. U. S. 2,681,306 sets forth an extractive distillation process for purifying acrylonitrile monomer containing acetonitrile, acetone, propionitrile and isopropanol as impurities. The present method provides for the mutual separation and purification of acrylonitrile, acetonitrile and propionitrile from aqueous solutions in a manner having greater efficiency and economy than previously proposed processes.

The method of the present invention preferably comprises feeding an aqueous solution containing acrylonitrile, acetonitrile and propionitrile into an extractor and introducing into the extractor a selective solvent for acetonitrile comprised of an aqueous solution substantially saturated with acrylonitrile and propionitrile. There is withdrawn from the extractor a fraction comprising an aqueous acetonitrile solution containing less than about 15 percent acrylonitrile and propionitrile, which impure aqueous acetonitrile solution is introduced into an extractive distillation column. Water is introduced into the top of the extractive distillation column as solvent, and an aqueous solution of substantially pure acetonitrile is withdrawn from the bottom of the extractive distillation column. A mixture of acrylonitrile, propionitrile and less than about 15 percent water is removed overhead from the extractive distillation column, and this mixture is fed to the extractor as a portion of the solvent. A second fraction comprising a mixture of acrylonitrile, propionitrile and less than about 15 percent water is also removed from the extractor and introduced into an azeotropic distillation column. There are removed overhead from the azeotropic distillation column the water azeotropes of acrylonitrile and propionitrile, these water azeotropes being separated into an aqueous phase substantially saturated with acrylonitrile and propionitrile and an organic phase. The aqueous phase is fed to the extractor as solvent, and the organic phase is returned to the azeotropic distillation column as reflux. A substantially anhydrous mixture of acrylonitrile and propionitrile is withdrawn from the bottom of the azeotropic distillation column and introduced into a fractional distillation column from which substantially pure anhydrous acrylonitrile and propionitrile are recovered.

One preferred method for achieving the mutual separation and purification of acrylonitrile, acetonitrile and propionitrile from aqueous solutions thereof is illustrated in the drawing, wherein an aqueous solution containing acrylonitrile, acetonitrile and propionitrile (which is obtained by water scrubbing the effluent gas stream from the above-mentioned acrylonitrile-producing reactions) is fed to a decanter 10. A typical feed composition to the decanter 10 comprises about 15.7 mole percent acrylonitrile, about 0.9 mole percent acetonitrile, about 0.4 mole percent propionitrile, and about 83 mole percent water. The separation of the organic layer from the aqueous layer provides an initial separation of the nitriles in the decanter 10. Since the acetonitrile will be completely soluble in water, while the acrylonitrile and propionitrile will not be, the aqueous layer leaving the decanter 10 and being fed to the extractive distillation column 12 will contain a much larger percentage of the acetonitrile than of the acrylonitrile or propionitrile. Although it is preferable to employ a decantation step, since it provides for a preliminary nitrile separation, it is also possible, and often desirable, to feed the aqueous solution of acrylonitrile, propionitrile and acetonitrile directly to an acetonitrile extractor such as is designated as 14. This liquid-liquid type extractor may be comprised of a column or columns, centrifugal apparatus or the like. The aqueous layer obtained from decanter 10 and containing the major portion of the acetonitrile, less than about 15 percent acrylonitrile and propionitrile, along with the aqueous solution of similar composition from the acetonitrile extractor 14, is charged to the extractive distillation column 12. Simultaneously a stream of water, as solvent, is introduced at or near the top of the column 12. The aqueous layer obtained from decanter 10 contains less than about 15 percent acrylonitrile and propionitrile and preferably less than about 10 percent. The amount of water introduced into column 12 is sufficient to maintain above about 70 mole percent concentration of water in the liquid phase on the top plates of column 12. The overhead product or distillate comprises a mixture of acrylonitrile, propionitrile and less than about 15 percent water, while the product removed from the bottom of column 12 comprises an aqueous solution of acetonitrile which may be distilled to give the acetonitrile-water azeotrope. The distillate from column 12 contains less than about 15 percent water and preferably less than about 10 percent. The aqueous acetonitrile solution, from the bottom of extractive distillation column 12, may be dried, if desired, by any suitable method. Examples of satisfactory drying methods are (1) extraction with a water-immiscible hydrocarbon or (2) azeotropic distillation with benzene at atmospheric pressure or with diethyl ether at superatmospheric pressures.

The partially concentrated organic layer leaving the decanter 10 is fed to the acetonitrile extractor 14. This organic layer contains the major portion of the acrylonitrile, small amounts of acetonitrile, and less than about 10 percent water. This organic layer preferably contains less than about 5 percent water. The function of the acetonitrile extractor 14 is to wash out the small amounts of acetonitrile contained in the organic layer with a minimum of water so as to take as small an amount of acrylonitrile and propionitrile in the water layer as possible. This is preferably achieved by means of the selective solvent for acetonitrile, which is introduced into the extractor 14. This selective extracting solvent is preferably made up of three components: (1) fresh water, (2) the overhead product from the extractive distillation column 12, and (3) the aqueous layer obtained from decanter 18. The aqueous layer from decanter 18, which is obtained by drying the raffinate stream (acrylonitrile, propionitrile and less than about 15 percent water) from the acetonitrile extractor 14, is substantially saturated with acrylonitrile and propionitrile. This nitrile-saturated aqueous layer is fed as extracting solvent to the acetonitrile extractor 14, together with the stream of similar composition obtained as the overhead product from the extractive distillation column 12. The extracting liquid or solvent thus fed to the extractor 14 contains no acetonitrile but does contain equilibrium or near equilibrium amounts of acrylonitrile and propionitrile. This suppresses subsequent extraction of either of these products from the organic layer being fed to the extractor 14 and thus makes the whole operation more economical and efficient in separating acetonitrile from the other two nitriles. Furthermore, the amount of fresh water which has to be added as solvent becomes comparatively small. This is desirable from the standpoint of heating, cooling and process water requirements. The solvent extraction in extractor 14 is preferably carried out at a temperature on the order of about 35° F. The aqueous solution removed from the extractor 14 and containing less than about 15 percent acrylonitrile and propionitrile is fed to the extractive distillation column 12. This aqueous solution preferably contains less than about 10 percent acrylonitrile and propionitrile. The raffinate stream separated from the extractor 14 and containing acrylonitrile, propionitrile and less than about 15 percent water is fed to an azeotropic distillation column 16 wherein it is subjected to an azeotropic distillation. The raffinate stream preferably contains less than about 5 percent water. All the water contained in the raffinate stream is carried off overhead as an azeotrope with acrylonitrile and propionitrile. The azeotropic distillation column 16 is made more efficient by decanting the overheads therefrom in decanter 18 and returning as reflux to the azeotropic column 16 the organic layer which is high in nitriles and low in water (about 96 percent acrylonitrile and propionitrile and about 4 percent water). The aqueous layer from decanter 18 is returned as extracting solvent to the acetonitrile extractor 14, where it is desirable to have a solvent high in water but saturated with respect to acrylonitriles and propionitriles. The substantially anhydrous mixture of acrylonitrile and propionitrile which is removed from the bottom of the azeotropic distillation column 16 is fed to a fractional distillation column 20 wherein the two nitriles are separated and recovered in a substantially pure and anhydrous state.

Since certain changes may be made in the above process without departing from the scope of the invention herein involved, it is intended that all matter contained in the above description, or shown in the accompanying drawing, shall be interpreted as illustrative and not in a limiting sense.

What is claimed is:

1. A method for the mutual separation of acrylonitrile, acetonitrile and propionitrile from an aqueous solution thereof which comprises feeding said aqueous solution into an acetonitrile extractor, introducing into said extractor a selective solvent for acetonitrile comprised of an aqueous solution substantially saturated with acrylonitrile and propionitrile, withdrawing from said acetonitrile extractor a fraction comprising an aqueous acetonitrile solution containing less than about 15 percent acrylonitrile and propionitrile, introducing said impure aqueous acetonitrile solution into an extractive distillation column, introducing water into the top of said extractive distillation column as solvent, withdrawing an aqueous solution of substantially pure acetonitrile from the bottom of said extractive distillation column, removing a mixture of acrylonitrile, propionitrile and less than about 15 percent water overhead from said extractive distillation column and feeding said mixture to said acetonitrile extractor as solvent, removing from said acetonitrile extractor a second fraction comprising a mixture of acrylonitrile, propionitrile and less than about 15 percent water, introducing said latter mixture into an azeotropic distillation column, removing overhead from said azeotropic column the water azeotropes of acrylonitrile and propionitrile, separating said water azeotropes of acrylonitrile and propionitrile into an aqueous phase saturated with acrylonitrile and propionitrile and an organic phase, feeding said aqueous phase to said acetonitrile extractor as solvent, returning said organic phase to said azeotropic distillation column as reflux, withdrawing a substantially anhydrous mixture of acrylonitrile and propionitrile from the bottom of said azeotropic distillation column, introducing said substantially anhydrous mixture into a fractional distillation column and recovering substantially pure anhydrous acrylonitrile and propionitrile therefrom.

2. A method for the mutual separation of acrylonitrile, acetonitrile and propionitrile from an aqueous solution thereof which comprises feeding said aqueous solution into an acetonitrile extractor, introducing into said extractor a selective solvent for acetonitrile comprised of an aqueous solution substantially saturated with acrylonitrile and propionitrile, withdrawing from said acetonitrile extractor a fraction comprising an aqueous acetonitrile solution containing less than about 10 percent acrylonitrile and propionitrile, introducing said impure aqueous acetonitrile solution into an extractive distillation column, introducing water into the top of said extractive distillation column as solvent, withdrawing an aqueous solution of substantially pure acetonitrile from the bottom of said extractive distillation column, removing a mixture of acrylonitrile, propionitrile and less than about 10 percent water overhead from said extractive distillation column and feeding said mixture to said acetonitrile extractor as solvent, removing from said acetonitrile extractor a second fraction comprising a mixture of acrylonitrile, propionitrile and less than about 5 percent water, introducing said latter mixture into an azeotropic distillation column, removing overhead from said azeotropic column the water azeotropes of acrylonitrile and propionitrile, separating said water azeotropes into an aqueous phase saturated with acrylonitrile and propionitrile and an organic phase, feeding said aqueous phase to the top of said acetonitrile extractor as solvent, returning said organic phase to said azeotropic distillation column as reflux, withdrawing a substantially anhydrous mixture of acrylonitrile and propionitrile from the bottom of said azeotropic distillation column, introducing said substantially anhydrous mixture into a fractional distillation column and recovering substantially pure anhydrous acrylonitrile and propionitrile therefrom.

3. A method for the mutual separation of acrylonitrile, acetonitrile and propionitrile from an aqueous solution thereof which comprises separating said aqueous solution into an aqueous phase and an organic phase, said aqueous phase being comprised essentially of acetonitrile and less than about 15 percent acrylonitrile and propionitrile, said organic phase being comprised essentially of acrylonitrile and propionitrile with minor amounts of acetonitrile and water, feeding said organic phase into an acetonitrile extractor, introducing into said acetonitrile extractor a selective solvent for acetonitrile comprised of an aqueous solution substantially saturated with acrylonitrile and propionitrile, withdrawing from said acetonitrile extractor a fraction comprising an aqueous acetonitrile solution containing less than about 15 percent acrylonitrile and propionitrile, introducing said impure aqueous acetonitrile solution and said aforementioned aqueous phase into an extractive distillation column, introducing water into the top of said extractive distillation column as solvent, withdrawing an aqueous solution of substantially pure acetonitrile from the bottom of said extractive distillation column, removing a mixture of acrylonitrile, propionitrile and less than about 15 percent water overhead from said extractive distillation column and feeding said mixture to the top of said acetonitrile extractor as solvent, removing from said acetonitrile extractor a second fraction comprising a mixture of acrylonitrile, propionitrile and less than about 15 percent water, introducing said latter mixture into an azeotropic distillation column, removing overhead from said azeotropic column the water azeotropes of acrylonitrile and propionitrile, separating said water azeotropes into an aqueous phase saturated with acrylonitrile and propionitrile and an organic phase, feeding said latter aqueous phase to said acetonitrile extractor as solvent, returning said latter organic phase to said azeotropic distillation column as reflux, withdrawing a substantially anhydrous mixture of acrylonitrile and propionitrile from the bottom of said azeotropic distillation column, introducing said substantially anhydrous mixture into a fractional distillation column and recovering substantially pure anhydrous acrylonitrile and propionitrile therefrom.

4. A method for the mutual separation of acrylonitrile, acetonitrile and propionitrile from an aqueous solution thereof which comprises separating said aqueous solution into an aqueous phase and an organic phase, said aqueous phase being comprised essentially of acetonitrile and less than about 10 percent acrylonitrile and propionitrile, said organic phase being comprised essentially of acrylonitrile and propionitrile with minor amounts of acetonitrile and water, feeding said organic phase into an acetonitrile extractor, introducing into said acetonitrile extractor a selective solvent for acetonitrile comprised of an aqueous solution substantially saturated with acrylonitrile and propionitrile, withdrawing from said acetonitrile extractor a fraction comprising an aqueous acetonitrile solution containing less than about 10 percent acrylonitrile and propionitrile, introducing said impure aqueous acetonitrile solution and said aforementioned aqueous phase into an extractive distillation column, introducing water into the top of said extractive distillation column as solvent, withdrawing an aqueous solution of substantially pure acetonitrile from the bottom of said extractive distillation column, removing a mixture of acrylonitrile, propionitrile and less than about 10 percent water overhead from said extractive distillation column and feeding said mixture to the top of said acetonitrile extractor as solvent, removing from said acetonitrile extractor a second fraction comprising a mixture of acrylonitrile, propionitrile and less than about 5 percent water, introducing said latter mixture into an azeotropic distillation column, removing overhead from said azeotropic column the water azeotropes of acrylonitrile and propionitrile, separating said water azeotropes into an aqueous phase saturated with acrylonitrile and propionitrile and an organic phase, feeding said latter aqueous phase to said acetonitrile extractor as solvent, returning said latter organic phase to said azeotropic distillation column as reflux, withdrawing a substantially anhydrous mixture of acrylonitrile and propionitrile from the bottom of said azeotropic distillation column, introducing said substantially anhydrous mixture into a fractional distillation column and recovering substantially pure anhydrous acrylonitrile and propionitrile therefrom.

5. A method for the mutual separation of acrylonitrile, acetonitrile and propionitrile from an aqueous solution thereof which comprises separating said aqueous solution into an aqueous phase and an organic phase, said aqueous phase being comprised essentially of acetonitrile and less than about 15 percent acrylonitrile and propionitrile, said organic phase being comprised essentially of acrylonitrile and propionitrile with minor amounts of acetonitrile and water, feeding said organic phase into an acetonitrile extracting column, introducing into the top of said acetonitrile extracting column a selective solvent for acetonitrile comprised of an aqueous solution substantially saturated with acrylonitrile and propionitrile, withdrawing from the bottom of said acetonitrile extracting column an aqueous acetonitrile solution containing less than about 15 percent acrylonitrile and propionitrile, introducing said impure aqueous acetonitrile solution and said aforementioned aqueous phase into an extractive distillation column, introducing water into the top of said extractive distillation column as solvent, withdrawing an aqueous solution of substantially pure acetonitrile from the bottom of said extractive distillation column, removing a mixture of acrylonitrile, propionitrile and less than about 15 percent water overhead from said extractive distillation column and feeding said mixture to the top of said acetonitrile extracting column as solvent, removing overhead from said acetonitrile extracting column a mixture of acrylonitrile, propionitrile and less than about 15 percent water, introducing said latter mixture into an azeotropic distillation column, removing overhead from said azeotropic column the water azeotropes of acrylonitrile and propionitrile, separating said water azeotropes into an aqueous phase saturated with acrylonitrile and propionitrile and an organic phase, feeding said latter aqueous phase to the top of said extracting column as solvent, returning said latter organic phase to said azeotropic distillation column as reflux, withdrawing a substantially anhydrous mixture of acrylonitrile and propionitrile from the bottom of said azeotropic distillation column, introducing said substantially anhydrous mixture into a fractional distillation column and recovering substantially pure anhydrous acrylonitrile and propionitrile therefrom.

No references cited.